US012368642B2

(12) United States Patent
Sartori et al.

(10) Patent No.: US 12,368,642 B2
(45) Date of Patent: Jul. 22, 2025

(54) PROVIDING INFORMATION

(71) Applicant: Nokia Solutions and Networks Oy, Espoo (FI)

(72) Inventors: Cinzia Sartori, Pullach (DE); Malgorzata Tomala, Wroclaw (PL); Ahmad Awada, Munich (DE); Anna Pantelidou, Massy (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/607,644

(22) PCT Filed: May 15, 2020

(86) PCT No.: PCT/EP2020/063665
§ 371 (c)(1),
(2) Date: Oct. 29, 2021

(87) PCT Pub. No.: WO2020/244905
PCT Pub. Date: Dec. 10, 2020

(65) Prior Publication Data
US 2022/0217046 A1    Jul. 7, 2022

(30) Foreign Application Priority Data
Jun. 7, 2019  (FI) .................................... 20195484

(51) Int. Cl.
*H04L 41/0853*   (2022.01)
*H04L 41/5009*   (2022.01)
*H04L 41/5022*   (2022.01)

(52) U.S. Cl.
CPC ...... *H04L 41/0853* (2013.01); *H04L 41/5009* (2013.01); *H04L 41/5022* (2013.01)

(58) Field of Classification Search
CPC ............ H04L 41/0853; H04L 41/5009; H04L 41/5022; H04L 41/5067; H04L 43/0888;
(Continued)

(56) References Cited

U.S. PATENT DOCUMENTS 10,039,016 B1 *  7/2018  Larish ................... H04W 24/02
2009/0232015 A1   9/2009  Domshitz et al.
(Continued)

FOREIGN PATENT DOCUMENTS

CN    101505309 A    8/2009
CN    106576248 A    4/2017
(Continued)

OTHER PUBLICATIONS

International Search Report & Written Opinion in International Application No. PCT/EP2020/063665 dated Jul. 3, 2020.
(Continued)

*Primary Examiner* — Joe Chacko
(74) *Attorney, Agent, or Firm* — Lippes Mathias LLP

(57) ABSTRACT

An apparatus, method and computer program product for: interfacing with at least a first radio access network function and a second radio access network function, sending a first message to the first radio access network function and a second message to the second radio access network function, the first message and the second message comprising a request to report information based on at least one criterion, receiving the reported information from the first radio access network function and the second radio access network function, and grouping the reported information and providing the grouped information to at least one radio access network optimization algorithm.

18 Claims, 4 Drawing Sheets

(58) Field of Classification Search
CPC ..... H04L 41/16; H04L 41/5019; H04L 67/60; H04W 24/10; H04W 88/085; H04W 24/02; H04W 4/70

See application file for complete search history.

(56) References Cited

U.S. PATENT DOCUMENTS

| | | | |
|---|---|---|---|
| 2011/0090873 | A1 | 4/2011 | Lee et al. |
| 2013/0329572 | A1 | 12/2013 | Gintis |
| 2015/0044974 | A1* | 2/2015 | Futaki .................. H04W 24/02 455/67.11 |
| 2017/0215083 | A1 | 7/2017 | Kudo et al. |
| 2017/0251383 | A1* | 8/2017 | Broustis ............ H04W 52/0206 |
| 2019/0075552 | A1 | 3/2019 | Yu et al. |
| 2019/0104458 | A1 | 4/2019 | Svennebring et al. |
| 2019/0158360 | A1 | 5/2019 | Xu et al. |
| 2019/0159277 | A1 | 5/2019 | Zhu et al. |
| 2019/0163790 | A1 | 5/2019 | Jennings et al. |
| 2020/0084766 | A1* | 3/2020 | Pawlak .............. H04W 72/0426 |
| 2020/0113008 | A1* | 4/2020 | Luo ........................ H04W 72/04 |
| 2020/0178198 | A1* | 6/2020 | Ding ...................... H04W 60/04 |
| 2020/0184382 | A1* | 6/2020 | Fishkov ................. G06N 20/20 |
| 2020/0374974 | A1* | 11/2020 | Sun ......................... H04L 41/20 |
| 2021/0377821 | A1* | 12/2021 | Shi ........................ H04W 48/08 |

FOREIGN PATENT DOCUMENTS

| | | |
|---|---|---|
| CN | 108702810 A | 10/2018 |
| EP | 2 827 635 A1 | 1/2015 |
| JP | 2017163571 A | 9/2017 |
| KR | 20180137397 A | 12/2018 |
| WO | WO 2014045240 A2 | 3/2014 |
| WO | WO 2017180338 A1 | 10/2017 |
| WO | WO 2018/202956 A1 | 11/2018 |
| WO | WO 2019098903 A1 | 5/2019 |
| WO | WO 2019/105095 A1 | 6/2019 |

OTHER PUBLICATIONS

Sallent O et al, "Data Analytics in the 5G Radio Access Network and Its Applicability to Fixed Wireless Access", 2019 IEEE 89th Vehicular Technology Conference (VTC2019-Spring), IEEE, Apr. 28, 2019 (Apr. 28, 2019), pp. 1-6, XP033568298, DOI: 10.1109/VTCSPRING.2019.8746553.

Khodapanah, et al. "Fulfillment of Service Level Agreements via Slice-Aware Radio Resource Management in 5G Networks", 2018 IEEE 6 pages.

3GPP TSG RAN WG2 Meeting #105bis, "Throughput measurement in NR MDT", Qualcomm Incorporated, R2-1904296, Apr. 8-12, 2019, 2 pgs.

3GPP TR 37.816 V16.0.0 Technical Report, Study on RAN-centric data collection and utilization for LTE and NR, (Jul. 2019) 35 pgs.

3GPP TSG RAN Meeting #81, :Study on RAN-centric Data Collection and Utilization for LTE and NR RP-182105, Sep. 10-13, 2018, 6 pages.

Huawei Ascend 910 AI chip unveiled—the greatest computing density on a single chip, https://mybroadband.co.za/news/technology/279227-huawei-ascend-910-ai-chip-unveiled-the-greatest-computing-density-on-a-single-chip.html, Oct. 10, 2018, printed Oct. 29, 2021, 5 pgs.

Huawei releases its 'AI Strategy' and its Full-Stack, All-Scenario AI Portfolio, https://www.itwire.com/development/84850--huaweihuawei--releasesreleases--itsits--aiai--strategystrategy--andand--itsits--fullfull--stack, Oct. 18, 2018, printed Oct. 29, 2021, 28 pgs.

Verizon: Vendor AI Not Ready for Prime Time, https://www.lightreading.com/artificial-intelligence-machine-learning/verizon-vendor-ai-not-ready-for-prime-time/d/d-id/746503?_mc=RSS_LR_EDT&page_number=1 Oct. 2, 2018, 8 pages.

Samdanis, et al. "From Network Sharing to Multi-Tenancy: The 5G Network Slice Broker", IEEE Communications Magazine-Communications Standards Supplement, Jul. 2016, pp. 32-39.

Clarke, Peter, "Alibaba forms AI and embedded processor development subsidiary" Oct. 12, 2018, https://www.eenewsembedded.com/news/alibaba-forms-ai-and-embedded-processor-development-subsiduary, accessed Dec. 8, 2021, 1 pg.

AT&T and Ericsson contribution, "Non-RT RIC & A1 interface discussion" Feb. 15, 2019 O-RAN Alliance, 39 pgs.

3GPP TSG-SA5 Meeting #123 Montreal, Canada, Jan. 21-25, 2019, S5-191391 "LS on PDCP end user throughput measurements" 5 pg Including Attachment S5-191484 "Add use case for PDCP end user throughput measurements", 2 pg.

* cited by examiner

| SENDER | | RIC OR CU-CP |
|---|---|---|
| RECEIVER | | CU-CP OR CU-UP OR DU |
| CELL-ID #1 | | PCI-ECGI |
| | SLICE-GROUP #1 | LIST OF (S-NSSAI) |
| | | ONE-TIME/PERIODIC |
| | | GRANULARITY |
| | | COUNTER-I (PM COUNTER) |
| | | COUNTER-N (PM-COUNTER) |
| | | LIST OF UEs (RAN-ID)-QOS FLOWS |
| | SLICE-GROUP #N | LIST OF (S-NSSAI) |
| | | ONE-TIME/PERIODIC |
| | | GRANULARITY |
| | | COUNTER-I (PM COUNTER) |
| | | COUNTER-N (PM-COUNTER) |
| | | LIST OF UEs (RAN-ID)-QOS FLOWS |
| CELL-ID #Y | | PCI-ECGI |

PROVIDING INFORMATION

TECHNICAL FIELD

The present application relates generally to providing information in a radio access network. More specifically, the present application relates to requesting information and providing received information to an algorithm.

BACKGROUND

Users creating and consuming more and more content and new technologies such as autonomous driving and internet of things (IoT) cause different kinds of requirements such as low latency and quality of service for radio access networks (RAN).

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: interfacing with at least a first radio access network function and a second radio access network function, sending a first message to the first radio access network function and a second message to the second radio access network function, the first message and the second message comprising a request to report information based on at least one criterion, receiving the reported information from the first radio access network function and the second radio access network function, and grouping the reported information and providing the grouped information to at least one radio access network optimization algorithm.

According to a second aspect of the invention, there is provided a method comprising: interfacing with at least a first radio access network function and a second radio access network function, sending a first message to the first radio access network function and a second message to the second radio access network function, the first message and the second message comprising a request to report information based on at least one criterion, receiving the reported information from the first radio access network function and the second radio access network function, and grouping the reported information and providing the grouped information to at least one radio access network optimization algorithm.

According to a third aspect of the invention, there is provided a computer program comprising instructions for causing an apparatus to perform at least the following: interfacing with at least a first radio access network function and a second radio access network function, sending a first message to the first radio access network function and a second message to the second radio access network function, the first message and the second message comprising a request to report information based on at least one criterion, receiving the reported information from the first radio access network function and the second radio access network function, and grouping the reported information and providing the grouped information to at least one radio access network optimization algorithm.

According to a fourth aspect of the invention, there is provided an apparatus comprising at least one processor and at least one memory including computer program code, the at least one memory and the computer program code configured to with the at least one processor, cause the apparatus at least to: interface with at least a first radio access network function and a second radio access network function, send a first message to the first radio access network function and a second message to the second radio access network function, the first message and the second message comprising a request to report information based on at least one criterion, receive the reported information from the first radio access network function and the second radio access network function, and group the reported information and provide the grouped information to at least one radio access network optimization algorithm.

According to a fifth aspect of the invention, there is provided a non-transitory computer readable medium comprising program instructions for causing an apparatus to perform at least the following: interfacing with at least a first radio access network function and a second radio access network function, sending a first message to the first radio access network function and a second message to the second radio access network function, the first message and the second message comprising a request to report information based on at least one criterion, receiving the reported information from the first radio access network function and the second radio access network function, and grouping the reported information and providing the grouped information to at least one radio access network optimization algorithm.

According to a sixth aspect of the invention, there is provided a computer readable medium comprising program instructions for causing an apparatus to perform at least the following: interfacing with at least a first radio access network function and a second radio access network function, sending a first message to the first radio access network function and a second message to the second radio access network function, the first message and the second message comprising a request to report information based on at least one criterion, receiving the reported information from the first radio access network function and the second radio access network function, and grouping the reported information and providing the grouped information to at least one radio access network optimization algorithm.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
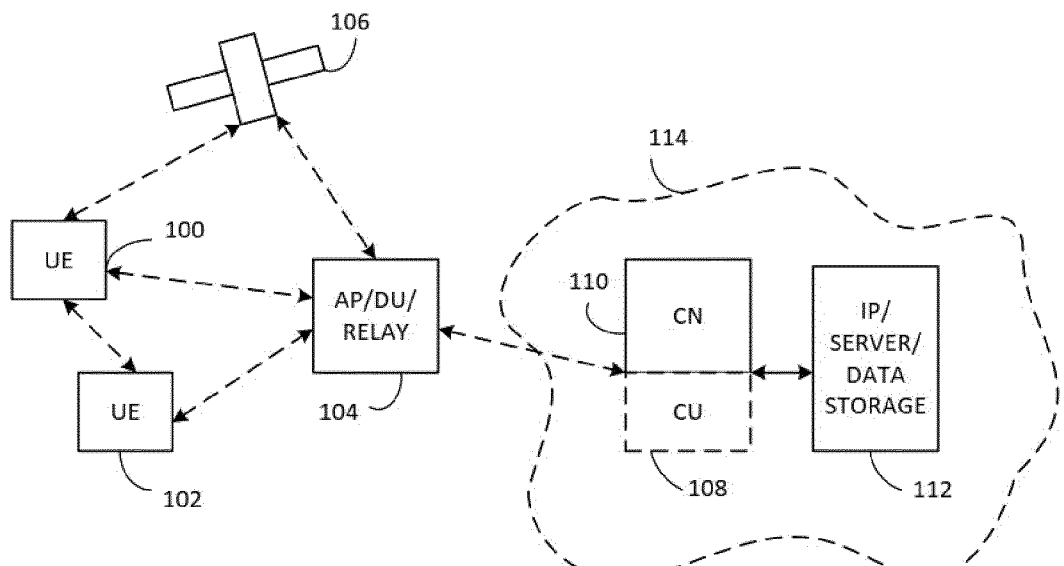
FIG. 1 shows a part of an exemplifying radio access network in which examples of disclosed embodiments may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate collecting information from a plurality of radio access network functions (RAN NFs). More particularly, example embodiments relate to receiving information from a first radio access network function and a second radio access network function and providing the received information to at least one machine learning algorithm.

According to an example embodiment, an apparatus is configured to interface with at least a first radio access network function and a second radio access network function. The apparatus is further configured to send a first message to the first radio access network function and a second message to a second radio access network function. According to an example embodiment, the first message and the second message comprise a request to report information based on at least one criterion. The apparatus is further configured to receive the reported information from the first radio access network function and the second radio access network function. The apparatus is further configured to group the reported information and provide the grouped information to at least one radio access network optimization algorithm.

According to an example embodiment, an apparatus is configured to interface with at least one radio access network function and send a message to the at least one radio access network function, the message comprising a request to report information based on at least one criterion. The apparatus is further configured to receive the reported information from the at least one radio access network function and group the reported information. The apparatus is yet further configured to provide the grouped information to at least one radio access network optimization algorithm. The apparatus may be configured to receive the reported information in response to sending the message.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. As further examples, the counterpart on the CN side can be an access and mobility management function (AMF), a session management function (SMF), or a user plane function (UPF).

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As commonly known in connection with wireless communication systems, control or management information is transferred over a radio interface, e.g. between the terminal device 100 and the access node 104.

A radio access network (RAN) may be used for hosting different kinds of services, which may cause conflicting requirements on the same infrastructure. Network slicing enables segmenting the RAN and creating multiple independent and dedicated virtual sub-networks within the same infrastructure. Network slicing enables running services that have different requirements on latency, reliability, throughput and mobility. A network slice may span across multiple parts of network such as radio access network, core network and transport network and it may also be deployed across multiple operators.

Network slices may be used for serving different customers separately based on a Service Level Agreement (SLA). Different network slices may have different SLAs. An SLA is a contract between a provider of a service and a customer. An SLA defines services the provider offers and the level of performance of the offered services. An SLA may include different parameters relating to a service such as a bit rate, latency, a packet error rate and/or a service level.

In order to achieve performance requirements such as low latency and enable network slicing, base station functions may be divided into a central unit (CU) and one or more distributed Units (DU). A CU is configured to control the one or more DUs via a logical interface such as F1 interface of 3GPP specifications. The F1 interface functionally splits a base station into a CU for upper protocol layer processing and a DU for lower protocol layer processing. A CU and a DU may comprise different network functions (NF) and the split between a CU and DUs may be used, for example, for virtualizing network functionalities. A CU is a logical node that may include functions such as transfer of user data, mobility control, radio access network sharing, positioning and session management. A DU is logical node that includes a subset of base station functions.

NFs are typically categorized into two groups: a user plane (UP) and a control plane (CP). For example, a central unit may be separated into a central unit control plane (CU-CP) and a central unit user plane (CU-UP). Separating the UP and the CP enables independently scaling the UP and the CP and, for example, specialize the UP for different applications without providing a dedicated CP for each application. A logical interface may be configured to support a control plane (CP) and a user plane (UP) separation. A CP comprises protocols for controlling sessions and a connection between a user equipment (UE) and the network. A UP comprises protocols for implementing an actual session service which carries user data. A CU may also be configured to communicate with other CUs via a control plane interface such as E1 interface of 3GPP specifications.

To determine the performance of a service in view of an agreed SLA, information may need to be collected in different parts of the Radio Access Network (RAN). For example, the needed information may be located in a DU, in a CU control plane (CU-CP) and/or CU user plane (CU-UP). Gathering the needed information in different places causes delay in reaction times. However, some functions such as Quality of Experience (QoE), Ultra-Reliable Low-Latency Communication (URLLC) and RAN slicing may require near real time information.

Figure 2:
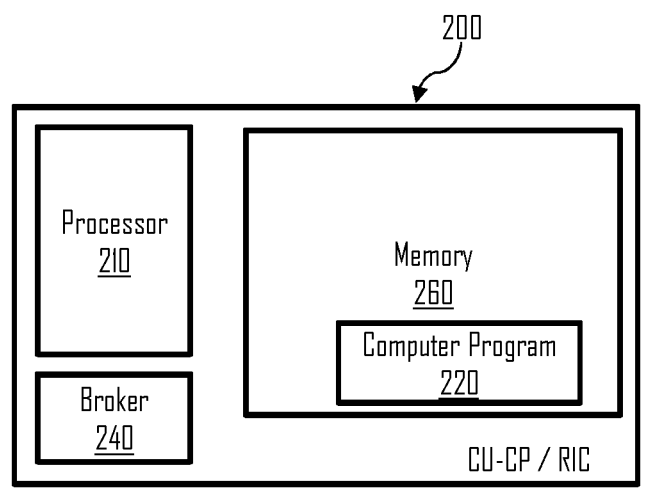
FIG. 2 shows a block diagram of an example apparatus in which examples of the disclosed embodiments may be applied.

The example of FIG. 2 shows an exemplifying apparatus.

FIG. 2 is a block diagram depicting the apparatus 200 operating in accordance with an example embodiment of the invention. The apparatus 200 may be, for example, an electronic device such as a chip, chip-set, an electronic device, a network function or an access node such as a base station. In the example of FIG. 2, the apparatus comprises a radio access network function (RAN NF) such as a central unit control plane (CU-CP) or a radio intelligent controller (RIC). A RAN NF is a processing function that has defined functional behaviour and defined interfaces. The apparatus 200 includes a processor 210, a broker 240 and a memory 260. In other examples, the apparatus 200 may comprise multiple processors.

According to an example embodiment, the apparatus 200 is configured to collect data relating to RAN metrics. The apparatus 200 may comprise a RAN broker for collecting the data. The RAN broker may be, for example, a broker function implemented in the apparatus 200. The apparatus 200 may be configured to collect the data in different levels of detail. For example, the apparatus 200 may be configured to collect data per UE, per network slice, per a set of network slices and/or per carrier.

According to an example embodiment, the broker 240 is a RAN broker configured to interface with a plurality of RAN NFs. The broker 240 is configured to collect data from a plurality of RAN NFs and deliver the data to one or more radio access network optimization algorithms executed in the apparatus 200. A radio access network optimization algorithm may comprise an algorithm for optimizing/improving operation, performance and/or one or more functions of a RAN. For example, a radio access network optimization algorithm may be used for optimizing RAN traffic. Radio access network optimization may comprise, for example, increasing or decreasing a priority of a service. A radio access network optimization algorithm may be implemented with, for example, a machine learning technology.

According to an example embodiment, the RAN broker 240 is implemented in the apparatus 200. According to an example embodiment, the broker 240 is configured to collect and store the received information such that the same data may be provided to a plurality of RAN optimization algorithms. The plurality of RAN optimization algorithms may be implemented with machine learning algorithms. According to an example embodiment, the broker 240 is configured to collect and store the received information such that the same data may be provided to a plurality of machine learning algorithms.

According to an example embodiment, the apparatus 200 is configured to run one or more machine learning (ML) algorithms for different purposes such as optimizing radio access network traffic and/or managing traffic congestion in a radio access network. Machine learning algorithms may comprise supervised learning, semi-supervised learning, unsupervised learning, reinforcement learning or any suitable artificial intelligence (AI) algorithms. ML algorithms may require near real-time information to comply with different requirements such as requirements relating to Quality of Experience (QoE), Ultra-Reliable Low-Latency Communication (URLLC) or Radio Access Network (RAN) slicing.

Without limiting the scope of the claims, an advantage of a RAN broker is that each ML algorithm in a RAN NF does not need not to request same data separately.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200.

Figure 3:
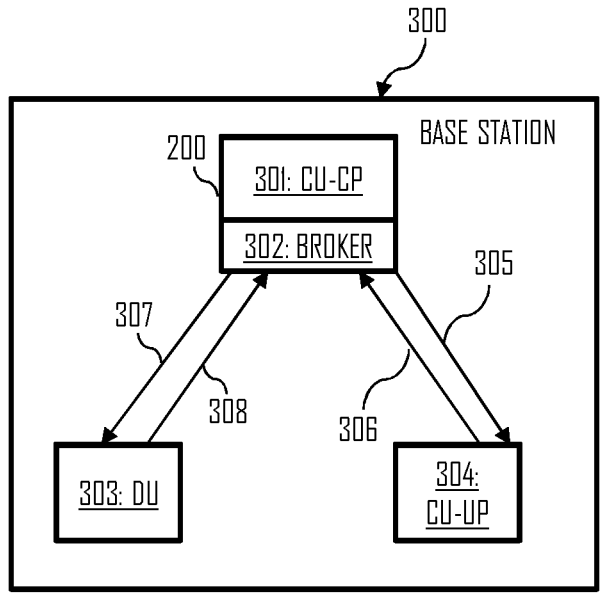
FIG. 3 shows a block diagram of an example overall architecture in which examples of disclosed embodiments may be applied.

FIG. 3 is a block diagram 300 comprising an apparatus 200 according to an example embodiment. The apparatus 200 comprises a central unit control plane (CU-CP) 301 and a RAN broker 302. The RAN broker 302 may be internal to the CU-CP 301.

In this example, the apparatus 200 is comprised by a base station such as a gNodeB or eNodeB. The base station comprises different RAN NFs: a central unit control plane (CU-CP) 301, a distributed unit (DU) 303 and a central unit user plane (CU-UP) 304. The NFs may be located in different physical locations according to, for example, operator requirements, physical site constraints, latency and capacity limitations. User plane (UP) functions may be located closer to the user than control plane (CP) functions.

According to an example embodiment, the apparatus 200 comprises a central unit control plane 301. The central unit control plane (CU-CP) 301 may be configured to host a radio resource controller (RRC) configured to manage signalling messages between the base station and a user equipment (UE).

According to an example embodiment, the apparatus 200 comprises a broker 302 for requesting and delivering information. According to an example embodiment, the broker 302 is comprised by a RAN NF. According to an example embodiment, the broker is a RAN broker. In the example of FIG. 3, the broker 302 is a RAN broker comprised by the CU-CP 301. The broker may be used for receiving and delivering information between different RAN NFs.

According to an example embodiment, the apparatus 200 is configured to interface with at least a first radio access network function and a second radio access network function. According to an example embodiment, the apparatus 200 is further configured to interface with a third radio access network function. The first radio access network function, the second radio access network function and the third radio access network function may be comprised by the base station. According to an example embodiment, the first radio access network function comprises a central unit user plane (CU-UP) 304. According to an example embodiment, the second radio access network function comprises a distributed unit (DU) 303. According to an example embodiment, the third radio access network function comprises a central unit control plane (CU-CP). According to an example embodiment, the apparatus 200 is configured to interface with more than three network functions. For example, the apparatus 200 may be configured to interface with a plurality of DUs and/or a plurality of CUs.

The apparatus 200 may be configured to interface with different radio access network functions via different interfaces or via a common interface. According to an example embodiment, the apparatus 200 is configured to interface with the first radio access network function via a first interface. The first interface may comprise an interface between a first central unit and a second central unit. For example, the first interface may comprise an E1 interface of 3GPP specifications. The first central unit and the second central unit may be comprised by the base station but may have different functions.

According to an example embodiment, the apparatus 200 is configured to interface with the second radio access network function via a second interface. The second interface may comprise an interface between a central unit and a distributed unit. For example, the second interface may comprise an F1 interface of 3GPP specifications. The central unit and the distributed unit may be comprised by the base station and the central unit may be configured to control the distributed unit.

According to an example embodiment, the apparatus 200 is further configured to send a first message 305 to the first radio access network function 304 and a second message 307 to the second radio access network function 303, the first message 305 and the second message 307 comprising a request to report information based on at least one criterion. According to an example embodiment, the apparatus 200 is configured to send a third message to a third radio access network function.

The apparatus 200 may be configured to send the first message 305 via the first interface and the second message 307 via the second interface. For example, the apparatus 200 may be configured to send the first message 305 to the CU-CP 304 via a E1 interface and the second message 307 to the DU 303 via an F1 interface.

According to an example embodiment, the at least one criterion is comprised by the first message and/or the second message. The at least one criterion comprised by the first message may be different from the criterion comprised by the second message or the at least one criterion comprised by the first message may be the same as the at least one criterion comprised by the second message. A criterion may relate to a type of requested information, a level of detail of requested information, a validity of requested information or any other criterion. The at least one criterion may comprise a criterion relating to a time scale of the requested information.

According to an example embodiment, the at least one criterion comprises near real-time data. Near real-time data may comprise data below a threshold value or between two threshold values. The threshold value may be defined by a single value, for example, in milliseconds, hundreds of milliseconds or a range of values. For example, data within a time scale of 10 milliseconds-500 milliseconds, 10 milliseconds-50 milliseconds or any other suitable time scale. According to an example embodiment, the near real-time comprises data within a time scale of 10 milliseconds-500 milliseconds.

According to an example embodiment, the at least one criterion comprises a level of detail of requested information. The level of detail may comprise, for example, information per a network element, per a physical entity, per network function or a combination thereof. For example, the level of detail may comprise information per transmitter, information per user equipment, information per a group of transmitters or information per a group of user equipment.

According to an example embodiment, the first message 305 is different from the second message 306. According to an example embodiment, a type of the message may depend on a radio access network function it is sent to. A first type of a message may be sent to a first RAN NF and a second type of a message may be sent to a second RAN NF. A type of the message may comprise a structure of the message. For example, a message sent to a CU-UP may be different from a message sent to a DU. According to an example embodiment, a type of the message may depend on the purpose of the message. A first type of message may be sent when information is requested from a RAN NF for a first purpose and a second type of message may be sent when information is requested for a second purpose.

According to an example embodiment, the structure of the first message is similar to the structure of the second message. According to another example embodiment, the structure of the first message and the structure of the second message are identical. According to a further example embodiment, the structure of the first message is different from the structure of the second message.

According to an example embodiment, the content of the first message is similar to the content of the second message. According to another example embodiment, the content of the first message and the content of the second message are identical. According to a further example embodiment, the content of the first message is different from the content of the second message.

The first message 305 and/or the second message 307 may comprise reporting instructions. According to an example embodiment, the first message 305 and the second message 307 comprise an instruction for reporting frequency. Reporting frequency may comprise a request to report information one-time or periodically.

According to an example embodiment, the apparatus 200 is configured to receive the reported information 306, 308 from the first radio access network function 304 and the second radio access network function 303. The reported information 306, 308 may comprise data collected by performance management (PM) counters in RAN NFs. According to an example embodiment reported data received from a RAN NF comprises performance metrics comprised by the RAN NF. Different RAN NFs may be configured to collect and/or provide different information. For example, a CU-CP may collect and/or provide information on the number of protocol data unit (PDU) sessions successfully setup, the number of released/dropped calls and the number of PDU sessions failed to setup. As another example, a DU may comprise information on average packet delay per session and MAC layer throughput measurement per 5G quality of service indicator (5QI)/dedicated radio bearer (DRB) per UE.

According to an example embodiment, the apparatus 200 is configured to receive the reported information 306, 308 in response to sending a message 305, 307 to a radio access network function 303, 304. For example, the apparatus 200 may be configured to receive reported information 306 from a first radio access network function 304 in response to sending a first message 305 to the first radio access network function 304. Further, the apparatus 200 may be configured to receive reported information 308 from a second radio access network function 303 in response to sending a second message 307 to the second radio access network function 303.

According to an example embodiment, the apparatus 200 is configured to group the received reported information and provide the grouped information to at least one machine learning algorithm. Grouping the received information may comprise selecting information from the received information that is needed by a machine learning algorithm. The grouped information provided to at least one machine learning algorithm may be used for, for example, monitoring a service level and performing actions based on the monitored service level. For example, if, the reported information indicates that the quality of experience for a particular UE is endangered, the priority of a service serving the UE may be increased and the priority of those UEs that can afford a reduction in a particular metric may be decreased.

Figure 4:
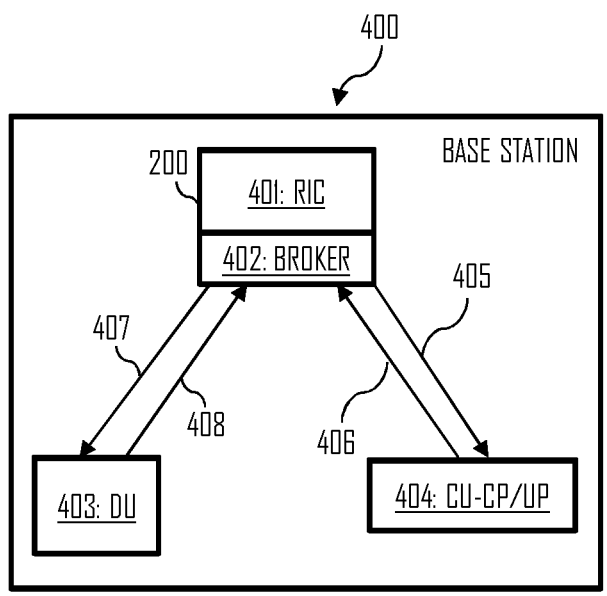
FIG. 4 illustrates another example overall architecture in which examples of disclosed embodiments may be applied.

FIG. 4 is a block diagram 400 comprising an apparatus 200 according to an example embodiment. Similarly to the example of FIG. 3, the apparatus 200 is comprised by a base station such as a gNodeB or eNodeB. In the example of FIG. 4, the apparatus 200 comprises a radio intelligent controller (RIC) 401 comprising a broker function 402. The RIC 401 comprises a set of policies that are sent to a RAN. The RAN is configured to execute the policies in real time.

Similarly to FIG. 3, the apparatus 200 comprises a broker 402 for requesting and delivering information. In the example of FIG. 4, the broker 402 is a RAN broker comprised by a RIC 401. According to an example embodiment, the broker is a RAN broker. In the example of FIG. 4, the broker 402 is a RAN broker comprised by the RIC 401. The broker may be used for receiving and delivering information between different RAN NFs.

The apparatus 200 is configured to interface with at least a first radio access network function and a second radio access network function. The first radio access network function and the second radio access network function may be comprised by the base station. According to an example embodiment, the first radio access network function comprises a central unit user plane (CU-UP) or a central unit control plane (CU-CP) 404 or both the CU-CP and CU-UP. According to an example embodiment, the second radio access network function comprises a distributed unit 403.

According to an example embodiment, the apparatus 200 is configured to interface with the first radio access network function and the second radio access network function via a common interface. Using a common interface, a RIC may be configured to interface with a central unit control plane (CU-CP), a central unit user plane (CU-UP) and/or a distributed unit (DU). A common interface may be, for example, an E2 interface of O-RAN specifications.

Similarly to the example embodiment of FIG. 3, the apparatus 200 of FIG. 4 is configured to send a first message 405 to the first radio access network function 404 and a second message 407 to the second radio access network function 403, the first message 405 and the second message 407 comprising a request to report information based on at least one criterion.

The apparatus 200 may be configured to send the first message 405 and the second message 407 via the common interface. For example, the apparatus 200 may be configured to send the first message 405 and the second message 407 via a E2 interface of O-RAN specifications.

Similarly to the example of FIG. 3, the structure of the first message and the structure of the second message may be similar, identical or different. Further, the content of the first message and the second message may be similar, identical or different.

The apparatus 200 is further configured to receive the reported information 406, 408 from the first radio access network function 404 and the second radio access network function 403. The apparatus may be configured to receive reported information from a radio access network function in response to sending a message to the radio access network function. For example, the apparatus 200 may be configured to receive reported information 406 from a first radio access network function 404 in response to sending a first message 405 to the first radio access network function 404. Further, the apparatus 200 may be configured to receive reported information 408 from a second radio access network function 403 in response to sending a second message 407 to the second radio access network function 403.

The reported information 406, 408 may comprise data collected by performance management (PM) counters. Similarly to FIG. 3, the reported information 406, 408 may comprise data collected by performance management (PM) counters in RAN NFs. According to an example embodiment, reported data received from a RAN NF comprises performance metrics comprised by the RAN NF. Different RAN NFs may comprise different information.

The apparatus 200 is further configured to group the reported information and provide the grouped information to at least one machine learning algorithm. Grouping the received information may comprise selecting information from the received information that is needed by a machine learning algorithm. The grouped information provided to at least one machine learning algorithm may be used for, for example, monitoring a service level and performing actions based on the monitored service level.

Figure 5:
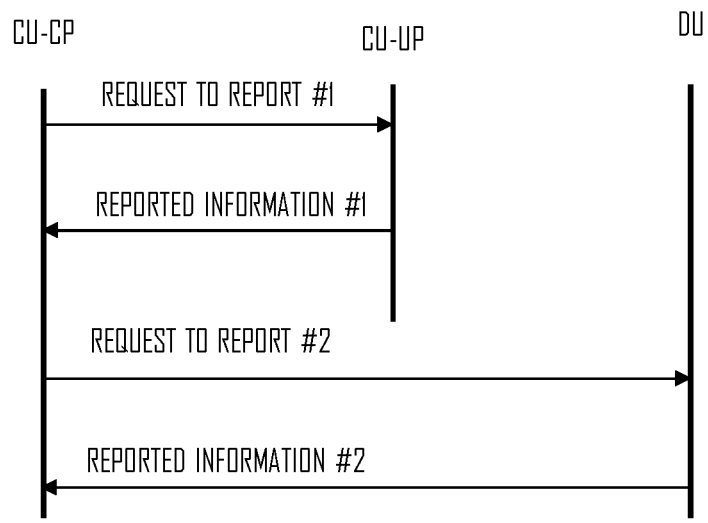
FIG. 5 illustrates an example signalling diagram incorporating aspects of the examples of the invention.

FIG. 5 illustrates an example signalling diagram depicting actions performed by the apparatus 200 of FIG. 3. More specifically, the actions may be performed by the broker 302 comprised by the apparatus 200. The apparatus 200 is configured to send a first message to a first RAN NF and a second message to a second RAN NF. In this example of FIG. 5, the first RAN NF comprises a CU-UP and the second RAN NF comprises a DU. The CU-CP sends a first message to a CU-UP and a second message to a DU. The first message and the second message comprise a request to report information and they may be different messages. The requested information may comprise near real time information accessible to the RAN NF that receives the request. The CU-CP receives reported information from the CU-UP and the DU. The reported information comprises near real time information that may then be grouped and provided to at least one machine learning algorithm.

Figure 6:
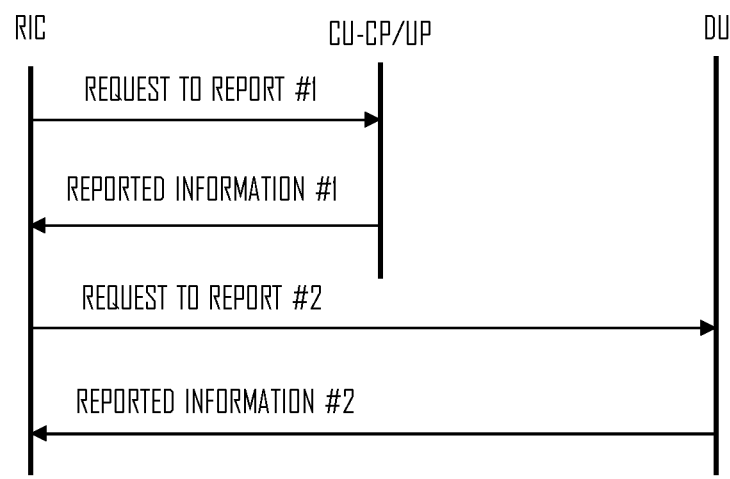
FIG. 6 illustrates an example signalling diagram incorporating aspects of the examples of the invention.

FIG. 6 illustrates another example signalling diagram depicting actions performed by the apparatus 200 of FIG. 4. More specifically, the actions may be performed by the broker 402 comprised by the apparatus 200. In the example of FIG. 6, the apparatus 200 comprises a radio intelligent controller (RIC). The apparatus 200 is configured to send a first message to a first RAN NF and a second messages to a second RAN NF. In this example of FIG. 6, the first RAN NF comprises a CU-CP or a CU-UP and the second RAN NF comprises a DU. The RIC sends a first message to a CU-CP/UP and a second message to a DU. The first message and the second message comprise a request to report information. The requested information may comprise near real time information accessible to the RAN NF that receives the request. The RIC receives the reported information from the CU-CP/UP and the DU. The reported information comprises near real time information that may then be grouped and provided to at least one access network optimization algorithm, for example, a machine learning algorithm.

Figures 7, 8:
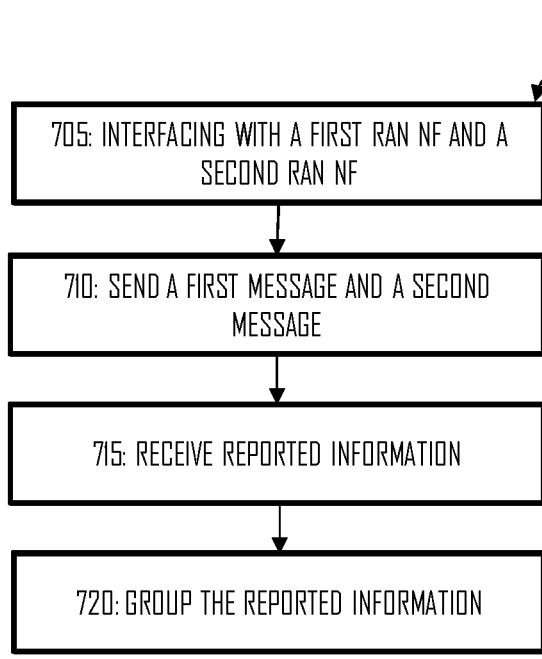
FIG. 7 illustrates an example method according to an example embodiment of the invention.
FIG. 8 illustrates an example report according to an example embodiment of the invention.

FIG. 7 illustrates a method 700 incorporating aspects of the previously disclosed embodiments. More specifically, the example method 700 illustrates collecting information from different radio access network functions. In the example of FIG. 7, the method may be performed by a RAN NF comprising a RAN broker implemented. The RAN NF may be, for example, a CU-CP or a RIC, for example.

The method starts with interfacing 705 with a first RAN NF and a second RAN NF. The first RAN NF may comprise, for example, a CU-UP and the second RAN NF may comprise, for example, a DU. The method continues with sending 710 a first message to the first RAN NF and a second message to the second RAN NF. The first message and the second message may comprise a request to report information based on at least one criterion. The at least one criterion may comprise near real-time data.

The method further continues with receiving 715 the reported information from the first RAN NF and the second RAN NF. The method further continues with grouping 720 the reported information and providing the grouped information to at least one machine learning algorithm.

FIG. 8 illustrates an example message for requesting a RAN NF to report information. According to an example embodiment, a message for requesting a RAN NF to report information comprises a predefined data structure. The message may be customized in dependence upon a type of a radio access network function receiving the message. The message comprises information on the sender and the receiver of the message. The sender may be a CU-CP or a RIC and the receiver may be a CU-CP, CU-UP or a DU.

The message in the example of FIG. 8 enables grouping the information into information per a cell and information concerning the cell may further be grouped into information per a network slice. A cell may be identified by an identifier such as a physical cell ID and an E-Utran cell global identifier (PCI-ECGI). A PCI is an identifier of a cell in the physical layer of a radio access network and it is used for separation of different transmitters. An ECGI is used for identifying cells globally. An ECGI comprises a mobile country code, a mobile network code and an E-UTRAN cell identifier.

In the example of FIG. 8, a request for information comprises an indication on granularity of the requested information in terms of a level of detail. For example, if a RAN NF is requested to report information per a single user, the information is collected with granularity per UE. If a RAN NF is requested to report information per a cell, the information is collected per transmitter.

The granularity of requested information may also be indicated in the message in terms of time domain. Time level granularity comprises the frequency of reporting the information. For example, once or periodically with a predefined time interval.

A radio access network slice may be identified by single network slice selection assistance information (S-NSSAI). The S-NSSAI may comprise a slice/service type (SST), which refers to the expected network slice behaviour in terms of features and services, and a slice differentiator (SD), which complements the slice/service types to differentiate amongst multiple network slices of the same slice/service type. A request for information per a RAN slice group comprises a request to list S-NSSAIs comprised by the RAN slice group. A slice group may comprise a set of RAN network slices with same characteristics. A request for information per a RAN slice further comprises an indication whether a RAN NF is requested to report information relating to the RAN slice one time or periodically. If the RAN NF is requested to report information periodically, granularity of reporting the information is indicated in the message. Time granularity comprises the frequency of reporting the information.

In the example of FIG. 8, a request for information per a RAN slice further comprises a request to list metrics from performance management counters (PMs) comprised by the RAN slice and a list of UE quality of service flows. A UE may be identified by a RAN-ID.

According to an example embodiment, the structure of a message enables collecting information at different levels of detail. For example, a message may trigger reporting of information per cell, per network slice, per UE and/or per UE flows.

The example message of FIG. 8 may be used, for example, collecting performance metrics for executing an SLA algorithm in a RAN NF such as a RIC or CU-CP. The RIC and/or the CU-CP may send a tailored message to one or more other RAN NFs comprising the needed information. As some metrics may be available in CU-CP, some may be available in other RAN NFs such as one or more DUs and/or CU-UP.

For example, the SLA algorithm may need average throughput of all best effort (BE) UEs in a geographic area spanning multiple cells and blocking rate of all UEs in a geographic area. To compute the average throughput, the RIC/CU-CP may request the necessary metrics from, for example, one or more DUs. Similarly, to compute the blocking rate, the RIC/CU_CP may request the necessary metrics from, for example, one or more DUs.

For critical UE services such as QoE or URLLC, the SLA algorithm may need metrics of the whole carrier and for RAN slicing the SLA algorithm may need the metrics of all carriers in the RAN slice. In this way, the SLA algorithm may indicate that the priority of the QoE/URLLC UE-service should be increased and that the priority of those UEs that can afford a reduction of a metric, should be decreased to conform with the SLA.

Without limiting the scope of the claims, an advantage of a radio access network function requesting another radio access network function to report information is that near real-time information may be received.

Another advantage may be that information available locally on a RAN NF may be received and used for RAN optimization. An advantage of a radio access network function comprising a broker for collecting and delivering information is that a radio access network function may comprise a plurality of machine learning algorithms that need the same data and with a broker function it may be avoided that each algorithm requests the same data separately.

Without in any way limiting the scope, interpretation, or application of the claims appearing below, a technical effect of one or more of the example embodiments disclosed herein is that a radio access network may be managed more efficiently and in near real-time.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined. Furthermore, even though the examples illustrate a first network function and a second network function, and sending a first message to the first network function and a second message to the second network function, there may be further network functions to which messages are sent. For example, a CU may be configured to control a plurality of DUs and in such a case messages may be sent to the plurality of DUs. In some example embodiments, there may be one network function to which a message is sent.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus of a base station, the apparatus comprising a broker for requesting and delivering information, the apparatus comprising at least one processor and at least one memory including computer program code, the at least one memory and the computer program code configured to with the at least one processor, cause the apparatus at least to:
   interface with at least a first radio access network function comprising a central unit user plane or a central unit control plane of the base station and a second radio access network function comprising a distributed unit of the base station;
   send a first message to the first radio access network function and a second message to the second radio access network function, each of the first message and the second message comprising a request to report information based on at least one criterion, wherein the at least one criterion comprises a level of detail of requested information, wherein the level of detail comprises at least one of: information per slice, information per transmitter, information per user equipment, information per a group of slices, information per a group of transmitters or information per a group of user equipment;
   receive the reported information from the first radio access network function and the second radio access network function; and
   group the reported information into at least one of: information per slice, information per transmitter, information per user equipment, information per a group of slices, information per a group of transmitters or information per a group of user equipment and provide the grouped information to a plurality of radio access network optimization algorithms for monitoring a service level and performing actions based on the monitored service level,
   wherein grouping the reported information comprises selecting information from the reported information that is needed by the optimization algorithms,
   wherein the apparatus is configured to interface with the second radio access network function via a second interface comprising an interface between a central unit of the base station and a distributed unit of the base station, and
   wherein the apparatus is configured to provide similar, identical or different grouped information to a first machine learning algorithm and to a second machine learning algorithm.

2. The apparatus according to claim 1, wherein the apparatus is configured to interface with the first radio access network function via a first interface comprising an interface between a first central unit and a second central unit.

3. The apparatus according to claim 1, wherein the apparatus is configured to interface with the first radio access network function and the second radio access network function via a common interface.

4. The apparatus according to claim 1, wherein the apparatus comprises a central unit control plane or a radio intelligence controller.

5. The apparatus according to claim 1, wherein the first message is different from the second message.

6. The apparatus according to claim 1, wherein the first and second messages comprise an instruction for reporting frequency.

7. The apparatus according to claim 1, wherein the at least one criterion comprises near real time data.

8. The apparatus according to claim 1, wherein the grouped information is used to determine performance of services based on a service level agreement.

9. The apparatus according to claim 1, the base station comprising a central unit and a distributed unit and wherein the first radio access network function resides in the central unit of the base station and the second radio access network function resides in the distributed unit of the base station.

10. The apparatus according to claim 1, wherein the at least one criterion comprised by the first message may be different from the criterion comprised by the second message or the at least one criterion comprised by the first message may be the same as the at least one criterion comprised by the second message.

11. A method comprising:
   interfacing with at least a first radio access network function comprising a central unit user plane or a central unit control plane of the base station and a second radio access network function comprising a distributed unit of the base station;
   sending a first message to the first radio access network function and a second message to the second radio access network function, each of the first message and the second message comprising a request to report information based on at least one criterion, wherein the at least one criterion comprises a level of detail of requested information, wherein the level of detail comprises at least one of: information per slice, information per transmitter, information per user equipment, information per a group of slices, information per a group of transmitters or information per a group of user equipment;
   receiving the reported information from the first radio access network function and the second radio access network function; and
   grouping the reported information into at least one of: information per slice, information per transmitter, information per user equipment, information per a group of slices, information per a group of transmitters or information per a group of user equipment and providing the grouped information to a plurality of radio access network optimization algorithms for monitoring a service level and performing actions based on the monitored service level,
   wherein grouping the reported information comprises selecting information from the reported information that is needed by the optimization algorithms,
   wherein interfacing with the second radio access network function comprises interfacing between a central unit of the base station and a distributed unit of the base station, and
   wherein the providing the grouped information comprises providing similar, identical or different grouped information to a first machine learning algorithm and to a second machine learning algorithm.

12. The method according to claim 11, wherein the at least one criterion comprises near real time data.

13. The method according to claim 11, wherein the grouped information is used to determine performance of services based on a service level agreement.

14. The method according to claim 11, wherein the at least one criterion comprised by the first message may be different from the criterion comprised by the second message or the at least one criterion comprised by the first message may be the same as the at least one criterion comprised by the second message.

15. A non-transitory computer readable medium comprising program instructions that, when executed by an apparatus, cause the apparatus to perform at least the following:
  interfacing with at least a first radio access network function comprising a central unit user plane or a central unit control plane of the base station and a second radio access network function comprising a distributed unit of the base station;
  sending a first message to the first radio access network function and a second message to the second radio access network function, each of the first message and the second message comprising a request to report information based on at least one criterion, wherein the at least one criterion comprises a level of detail of requested information, wherein the level of detail comprises at least one of: information per slice, information per transmitter, information per user equipment, information per a group of slices, information per a group of transmitters or information per a group of user equipment;
  receiving the reported information from the first radio access network function and the second radio access network function; and
  grouping the reported information into at least one of: information per slice, information per transmitter, information per user equipment, information per a group of slices, information per a group of transmitters or information per a group of user equipment and providing the grouped information to a plurality of radio access network optimization algorithms for monitoring a service level and performing actions based on the monitored service level,
  wherein grouping the reported information comprises selecting information from the reported information that is needed by the optimization algorithms,
  wherein the apparatus is caused to interface with the second radio access network function via a second interface comprising an interface between a central unit of the base station and a distributed unit of the base station, and
  wherein the apparatus is caused to provide similar, identical or different grouped information to a first machine learning algorithm and to a second machine learning algorithm.

16. The non-transitory computer readable medium according to claim 15, wherein the at least one criterion comprises near real time data.

17. The non-transitory computer readable medium according to claim 15, wherein the grouped information is used to determine performance of services based on a service level agreement.

18. The non-transitory computer readable medium according to claim 15, wherein the at least one criterion comprised by the first message may be different from the criterion comprised by the second message or the at least one criterion comprised by the first message may be the same as the at least one criterion comprised by the second message.

* * * * *